United States Patent [19]
Gao et al.

[11] Patent Number: 5,964,903
[45] Date of Patent: Oct. 12, 1999

[54] METHOD OF PREPARING ELECTROCHEMICAL CELLS

[75] Inventors: Feng Gao, Henderson; Porter H. Mitchell, Las Vegas; Jeremy Barker, Henderson, all of Nev.

[73] Assignee: Valence Technology, Inc., Henderson, Nev.

[21] Appl. No.: 08/839,006

[22] Filed: Apr. 23, 1997

[51] Int. Cl.⁶ .............................. H01M 2/18; H01M 4/60
[52] U.S. Cl. ...................... 29/623.1; 429/303; 429/316
[58] Field of Search ..................... 429/218, 192, 429/194; 29/623.1, 623.5

[56] References Cited

U.S. PATENT DOCUMENTS

| | | | |
|---|---|---|---|
| 4,327,150 | 4/1982 | White et al. | 428/332 |
| 4,948,490 | 8/1990 | Venkatsetty | 204/412 |
| 5,057,565 | 10/1991 | Noding et al. | 524/109 |
| 5,227,101 | 7/1993 | Mahoney et al. | 264/28 |
| 5,418,091 | 5/1995 | Gozdz et al. | 429/252 |
| 5,460,904 | 10/1995 | Gozdz et al. | 429/192 |
| 5,540,741 | 7/1996 | Gozdz et al. | 29/623.5 |
| 5,552,239 | 9/1996 | Gozdz et al. | 429/94 |
| 5,571,634 | 11/1996 | Gozdz et al. | 429/192 |
| 5,670,273 | 9/1997 | Velasquez et al. | 429/162 |
| 5,688,293 | 11/1997 | Oliver et al. | 29/623.1 |
| 5,690,703 | 11/1997 | Mitchell et al. | 29/623.5 |

FOREIGN PATENT DOCUMENTS

| | | |
|---|---|---|
| 0633 578 | 1/1995 | European Pat. Off. . |
| 96 21639 | 7/1996 | WIPO . |

*Primary Examiner*—Maria Nuzzolillo
*Assistant Examiner*—Carol Chaney
*Attorney, Agent, or Firm*—Young & Basile, P.C.

[57] ABSTRACT

A method of fabricating electrochemical cells employing novel plasticizers that can be removed by evaporation under vacuum is provided thereby obviating the need for solvent extraction. The plasticizers comprise 2-(2-ethoxyethoxy) ethyl acetate, dimethyl adipate, dibutyl phthalate, propylene carbonate, and mixtures thereof.

33 Claims, No Drawings

METHOD OF PREPARING ELECTROCHEMICAL CELLS

FIELD OF THE INVENTION

The present invention relates to electrochemical devices and, more particularly, to a method of fabricating non-aqueous electrochemical cells that employs novel plasticizers.

BACKGROUND OF THE INVENTION

Non-aqueous lithium electrochemical cells typically include an anode, a lithium electrolyte prepared from a lithium salt dissolved in one or more organic solvents and a cathode of an electrochemically active material, typically a chalcogenide of a transition metal. During discharge, lithium ions from the anode pass through the liquid electrolyte to the electrochemically active material of the cathode where the ions are taken up with the simultaneous release of electrical energy. During charging, the flow of ions is reversed so that lithium ions pass from the electrochemically active cathode material through the electrolyte and are plated back onto the lithium anode. Non-aqueous lithium electrochemical cells are discussed in U.S. Pat. Nos. 4,472,487, 4,668,595, 5,028,500, 5,441,830, 5,460,904, and 5,540,741.

Recently, the lithium metal anode has been replaced with a carbon anode such as coke or graphite intercalated with lithium ions to form $Li_xC_6$. In operation of the cell, lithium passes from the carbon through the electrolyte to the cathode where it is taken up just as in a cell with a metallic lithium anode. During recharge, the lithium is transferred back to the anode where it reintercalates into the carbon. Because no metallic lithium is present in the cell, melting of the anode does not occur even under abuse conditions. Also, because lithium is reincorporated into the anode by intercalation rather than by plating, dendritic and spongy lithium growth does not occur.

Various factors influence the performance of electrochemical cells. For instance, the morphology of the polymeric matrix and of the polymeric binders in the anode and/or cathode can affect conductivity of the salts. Improved conductivity has been demonstrated by employing porous polymeric matrices and polymeric binders. One method of producing such porous structures comprises forming polymeric structures in the presence of a plasticizer such as dibutyl phthalate; upon removal of the plasticizer, pores are created in the polymer. Plasticizers can comprise up to about 50 percent of the weight of an electrochemical cell precursor prior to their removal. Current methods of removing these solvents include extraction wherein the separating agent is another organic liquid solvent such as dimethyl ether, methanol, and cyclohexane. Typically, in assembling an electrochemical cell, an electrolyte solution comprising an electrolyte solvent and salt is added to activate the electrochemical cell precursor shortly after removing the plasticizer.

Although electrochemical cells fabricated using conventional plasticizers generally demonstrate good electrochemical performance, current plasticizers must be extracted with hazardous organic solvents. The art is in search of more economical, safer, and efficient methods of preparing electrochemicals particularly methods which employ plasticizers that can be removed without the use of such solvents.

SUMMARY OF THE INVENTION

The present invention is based in part on the discovery of novel plasticizers suitable for use in fabricating electrochemical cells. A critical aspect of the invention is that the plasticizer can be removed from the anode, cathode, and/or solid electrolyte or separator layer by vacuum so that no solvent extraction process is required.

In one aspect, the invention is directed to a method of preparing an electrochemical cell that includes the steps of:

(a) preparing an anode precursor by forming an anode film comprising a carbon material, a first polymeric binder, and a first plasticizer and thereafter removing said first plasticizer;

(b) preparing a cathode precursor by forming a cathode film comprising a cathodic material, a second polymeric binder, and a second plasticizer and thereafter removing said second plasticizer;

(c) preparing a polymeric electrolyte precursor by forming a polymeric matrix comprising a third plasticizer and thereafter removing said third plasticizer; and (d) activating said anode precursor, said cathode precursor, and said polymeric electrolyte precursor, wherein said polymeric precursor is positioned between said anode precursor and said cathode precursor, and wherein at least in one of steps (a), (b), or (c), said plasticizer is removed by evaporation under vacuum.

In another aspect, the invention is directed to a method of preparing an electrochemical cell that includes the steps of:

(a) forming an anode film comprising anode active material, a polymeric binder and a first plasticizer;

(b) forming a cathode film comprising a cathode active material, a polymeric binder and a second plasticizer;

(c) forming a polymeric layer comprising a third plasticizer;

(d) positioning said polymeric layer between said anode film and said cathode film to form a tri-layer structure;

(e) removing said plasticizers from the tri-layer structure by evaporation under vacuum to form an electrochemical cell precursor; and (f) activation said electrochemical cell precursor to form an electrochemical cell.

In a preferred embodiment, said polymeric electrolyte precursor is laminated to said anode precursor and to said cathode precursor prior removing the plasticizers. Preferably, the plasticizer is removed by placing the precursor in a chamber and establishing a vacuum in the chamber of less than about 1 torr and pumping plasticizer from the chamber. The chamber can be is heated to temperature of about 30° C. to about 135° C. to facilitate evolution of the plasticizer.

The invention is also directed to electrode and solid electrolyte precursors containing the novel plasticizer. In a preferred embodiment, the plasticizers comprise 2-(2-ethoxyethoxy) ethyl acetate, dimethyl adipate, dibutyl phthalate or propylene carbonate.

DETAILED DESCRIPTION OF THE PREFERRED EMBODIMENTS OF THE INVENTION

The present invention is directed to methods of preparing electrochemical cells. Preferred cells include: a cathode comprising an active cathodic material, an intercalation based carbon anode, with each electrode capable of reversibly incorporating (e.g., intercalating) an alkali metal ion, and a polymeric matrix containing an electrolyte solution comprising an organic electrolyte solvent and a salt of the alkali metal. Each electrode preferably has a current collector. Particularly preferred electrochemical cells and batteries use lithium and salts thereof.

However, prior to describing this invention in further detail, the following terms will be defined.

The term "plasticizer" refers to an organic compound, having limited solubility of the polymers that form the polymeric matrix of the separator (or solid electrolyte) layer and of the polymer binders in the anode and cathode, which facilitates the formation of porous polymeric structures. Plasticizers of the present invention comprise organic compounds, including low molecular weight polymers, that are liquids at ambient temperatures. By "porous structure" is meant that upon removal of the plasticizer the polymeric matrix and binders remain as a porous mass. Suitable plasticizers have boiling points typically above about 130° C. Preferably the boiling point of the plasticizer is from 145° C. to 550° C.; more preferably 160° C. to 450° C. and most preferably 175° C. to 350° C.

A number of criteria are important in the choice of plasticizer including compatibility with the components of the electrochemical cell precursor and electrode precursor, processability, and low polymer solubility. A critical feature of the plasticizer is that it can be separated from the electrode precursor, separator (or solid electrolyte) precursor, and/or electrochemical cell precursor by evaporation under vacuum. By "evaporation under vacuum" is meant that the plasticizer is removed by suction at a pressure below atmospheric. Preferably this is achieved by placing the electrochemical cell precursor in a chamber and then creating a vacuum in the chamber with a vacuum pump. The pressure of the vacuum is typically less than about 1 torr (or mm Hg), preferably less than 0.1 torr, more preferably less than 0.01 torr and most preferably less than about 0.001 torr. The evaporation can be facilitated by heating the precursor containing the plasticizer.

The temperature is maintained typically from about 20° C. to about 150° C. depending on the boiling point of the plasticizer and melting point of the polymer binder used. Preferably, the temperature is from 30° C. to 135° C., more preferably 35° C. to 125° C. and most preferably 40° C. to 115° C.

Suitable plasticizers include, for example, alkyl/aryl esters (e.g., butyl, hexyl, 2-ethoxyethyl, phenyl and benzyl 2-(2-ethoxyethoxy)ethyl acetates) or diesters (e.g., dimethyl, diethyl, dipropyl, dibutyl, diphenyl oxalates, succinates, adipates, suberates, azelates, sebacates and phthalates), lactones (e.g., gamma-butyrolactone and 3-methyl-gamma-butyrolactone), alkyl/aryl carbonates (e.g., propylene, butylene, diethyl, dipropyl, dibutyl, bis(2-methoxyethyl), methyl ethyl, methyl propyl, ethyl propyl, methyl isopropyl, and methyl methoxyethyl carbonates), alkyl/aryl phosphates (e.g., trimethyl, triethyl, tripropyl, tributyl, triphenyl, tritolyl and unsymmetric phosphates), acrylates, amides, nitriles, borates, sulfolanes, sulphates and low molecular weight polymers (e.g., polyesters, polyacrylates, polycarbonates, and polyacrylonitriles). Depending on the particular low molecular weight polymer, the average molecular weight preferably ranges from about 500 to about 10,000, and more preferably from about 1,000 to about 5,000. Preferred plasticizers are esters, diesters, carbonates, phosphates, acrylates, borates, sulfolanes and sulphates. Particularly preferred plasticizers include esters (for example, 2-(2-ethoxyethoxy) ethyl acetate, EEEA), diesters (for example, dimethyl adipate, DMA and dibutyl phthalate, DBP), carbonates (for example, propylene carbonate, PC), phosphates and acrylates.

In operation, the plasticizer is first well mixed with a polymer. Thereafter the plasticizer is removed by evaporation under vacuum and in the process the porous structure is formed. Preferably the weight ratio of plasticizer to polymer is from about 1 to about 50, more preferably about 10 to about 30, and most preferably about 20 to about 25. For the anode precursor, the plasticizer typically comprises about 1% to 55%, and more preferably comprises about 5% to 45%, of the precursor prior to removal under vacuum. Similarly, for the cathode precursor, the plasticizer typically comprises about 1% to 55%, and more preferably comprises about 10% to 40%, of the precursor prior to removal under vacuum. Finally, for the separator layer (or solid electrolyte) precursor, the plasticizer typically comprises about 1% to 75%, and more preferably comprises about 10% to 65%, of the precursor prior to removal under vacuum. (All percentages herein are on a weight basis.)

The term "electrochemical cell precursor" or "electrolytic cell precursor" refers to the structure of the electrochemical cell prior to the addition of the inorganic salt and electrolyte solvent. The precursor typically comprises (each in precursor form) an anode, a cathode, polymeric matrix and plasticizer. The anode and/or cathode may each include a current collector. The polymeric matrix can function as a separator between the anode and cathode.

The term "activation" refers to the placement of an inorganic salt and electrolyte solvent into the porous portions of an electrochemical cell precursor. After activation, the electrochemical cell is charged by an external energy source prior to use.

The term "electrolytic cell" or "electrochemical cell" refers to a composite containing an anode, a cathode and polymeric layer comprising an electrolyte solution interposed therebetween. The polymeric layer can function as a separation layer.

The term "battery" refers to two or more electrochemical cells electrically interconnected in an appropriate series/parallel arrangement to provide the required operating voltage and current levels.

The term "solid polymeric matrix" refers to an electrolyte compatible material formed by polymerizing an organic or inorganic monomer (or partial polymer thereof) and which, when used in combination with the other components of the electrolyte, renders the electrolyte solid. Suitable solid polymeric matrices are well known in the art and include solid matrices formed from organic polymers, inorganic polymers or a mixture of organic polymers with inorganic non-polymeric materials. Preferably, the solid polymeric matrix is an organic matrix derived from a solid matrix forming monomer and from partial polymers of a solid matrix forming monomer. See, for example, U.S. Pat. Nos. 5,501, 921, 5,498,491, 5,491,039, 5,489,491, 5,482,795, 5,463,179, 5,419,984, 5,393,621, 5,358,620, 5,262,253, 5,346,787, 5,340,669, 5,300,375, 5,294,501, 5,262,253, and 4,908,283, which are incorporated herein. Inorganic monomers are disclosed in U.S. Pat. Nos. 4,247,499, 4,388,385, 4,414,607, 4,394,280, 4,432,891, 4,539,276, and 4,557,985, which are incorporated herein.

The solid matrix forming monomer or partial polymer can be cured or further cured prior to or after addition of the salt, solvent and, optionally, a viscosifier. For example, a composition comprising requisite amounts of the monomer or partial polymer, salt, organic carbonate solvent and viscosifier can be applied to a substrate and then cured. Alternatively, the monomer or partial polymer can be first cured and then dissolved in a suitable volatile solvent.

Requisite amounts of the salt, organic carbonate solvent and viscosifier can then be added. The mixture is then placed on a substrate and removal of the volatile solvent would result in the formation of a solid electrolyte. In either case, the resulting solid electrolyte would be a homogeneous, single phase product which is maintained upon curing, and does not readily separate upon cooling to temperatures below room temperature.

The term "substrate" refers to any suitable film made of material that is compatible with the components of the polymer mixture. The substrate serves as the vehicle or base onto which the electrode mixture is applied. After the solvent has evaporated from the mixture, the polymer matrix is formed. Suitable substrates include, for example, paper, e.g, 20 or 24 weight paper, polyester (MYLAR™), polypropylene, polyethylene films and non-woven webs.

Preferably, the solid polymeric matrix is formed by a casting process which does not require the use of monomers or prepolymers, that is, no curing is required. A preferred method employs a copolymer of vinylidenedifluoride and hexafluoropropylene dissolved in acetone or other suitable solvent(s). Upon casting the solution, the solvent is evaporated to form the solid polymeric matrix. The solution may be casted directly onto a current collector. Alternatively, the solution is casted onto a substrate, such as a carrier web, and after the solvent (e.g., acetone) is removed, an electrode film is formed thereon.

The term "salt" refers to any salt, for example, an inorganic salt, which is suitable for use in a non-aqueous electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiClO_4$, $LiSCN$, $LiBF_4$, $LiAsF_6$, $LiCF_3SO_3$, $LiPF_6$, $(CF_3SO_2)_2NLi$, $(CF_3SO_2)_3CLi$, $NaSCN$, and the like. The inorganic ion salt preferably contains at least one cation selected from the group consisting of Li, Na, Cs, Rb, Ag, Cu, Mg and K.

The electrolyte typically comprises from about 5 to about 25 weight percent of the inorganic ion salt based on the total weight of the electrolyte; preferably, from about 10% to 20%, and even more preferably from about 10% to about 15%. The percentage of salt depends on the type of salt and electrolytic solvent employed.

The term "compatible electrolyte solvent" or "electrolytic solvent," or in the context of components of the non-aqueous electrolyte, just "solvent," is a low molecular weight organic solvent added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery. Typical examples of solvent are mixtures of such materials as dimethyl carbonate, diethyl carbonate, propylene carbonate, ethylene carbonate, methyl ethyl carbonate, gamma-butyrolactone, triglyme, tetraglyme, dimethylsulfoxide, dioxolane, sulfolane, and the like. When using propylene carbonate based electrolytes in an electrolytic cell with graphite anodes, a sequestering agent, such as a crown ether, is added in the electrolyte.

For electrochemical cells where (1) the cathode comprises lithiated cobalt oxides, lithiated manganese oxides, lithiated nickel oxides, $Li_xNi_{1-y}Co_yO_2$, where x is preferably about 1 and y is preferably 0.1-0.9, $LiNiVO_4$, or $LiCoVO_4$, and (2) the anode comprises carbon and/or graphite, the electrolytic solvent preferably comprises a mixture of ethylene carbonate and dimethyl carbonate.

The term "organic carbonate" refers to hydrocarbyl carbonate compounds of no more than about 12 carbon atoms and which do not contain any hydroxyl groups. Preferably, the organic carbonate is an aliphatic carbonate and more preferably a cyclic aliphatic carbonate.

Suitable cyclic aliphatic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-dioxolan-2-one; 4,4-dimethyl- 1,3-dioxolan-2-one; 4-methyl-5-ethyl-1,3-dioxolan-2-one; 4,5-diethyl- 1,3-dioxolan-2-one; 4,4-diethyl-1,3-dioxolan-2one; 1,3-dioxan-2-one; 4,4-dimethyl-1,3-dioxan-2-one; 5,5-dimethy-1-1,3-dioxan-2-one; 5-methyl-1,3-dioxan-2-one; 4-methyl-1,3-dioxan-2-one; 5,5-diethyl-1,3-dioxan-2-one; 4,6-dimethyl-1,3-dioxan-2-one; 4,4,6-trimethyl-1,3-dioxan-2-one; and spiro (1,3-oxa-2-cyclohexanone-5',5', 1', 3'-oxa-2'-cyclohexanone).

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-$\alpha,\beta$-diol (dihydroxy alkanes having hydroxyl substituents on adjacent carbon atoms) or an alkane-$\alpha,\gamma$-diol (dihydroxy alkanes having hydroxyl substituents on carbon atoms in a 1,3 relationship) yields an cyclic aliphatic carbonate for use within the scope of this invention. See, for instance, U.S. Pat. No. 4,115,206, which is incorporated herein by reference in its entirety.

Likewise, the cyclic aliphatic carbonates useful for this invention may be prepared by transesterification of a suitable alkane-$\alpha,\beta$-diol or an alkane-$\alpha,\gamma$-diol with, e.g., diethyl carbonate under transesterification conditions. See, for instance, U.S. Pat. Nos. 4,384,115 and 4,423,205 which are incorporated herein by reference in their entirety. Additional suitable cyclic aliphatic carbonates are disclosed in U.S. Pat. No. 4,747,850 which is also incorporated herein by reference in its entirety.

The term "viscosifier" refers to a suitable viscosifier for solid electrolytes. Viscosifiers include conventional viscosifiers such as those known to one of ordinary skill in the art. Suitable viscosifiers include film forming agents well known in the art which include, by way of example, polyethylene oxide, polypropylene oxide, copolymers thereof, and the like, having a number average molecular weight of at least about 100,000, polyvinylpyrrolidone, carboxymethylcellulose, and the like. Preferably, the viscosifier is employed in an amount of about 1 to about 10 weight percent and more preferably at about 2.5 weight percent based on the total weight of the electrolyte composition.

The anode typically comprises a compatible anodic material which is any material which functions as an anode in a solid electrolytic cell. Such compatible anodic materials are well known in the art and include, by way of example, lithium, lithium alloys, such as alloys of lithium with aluminum, mercury, manganese, iron, zinc, intercalation based anodes such as those employing carbon, tungsten oxides, and the like. Preferred anodes include lithium intercalation anodes employing carbon materials such as graphite, cokes, mesocarbons, and the like. Such carbon intercalation based anodes typically include a polymeric binder and a plasticizer suitable for forming a bound porous composite having a molecular weight of from about 1,000 to 5,000,000. Examples of suitable polymeric binders include EPDM (ethylene propylene diamine termonomer), PVDF (polyvinylidene difluoride), EAA (ethylene acrylic acid copolymer), EVA (ethylene vinyl acetate copolymer), EAA/EVA copolymers, and the like. The anode may also include an electron conducting material such as carbon black.

The composite cathode preferably comprises a compatible cathodic material (i.e., insertion compounds) which is any material which functions as a positive pole in a solid electrolytic cell. Such compatible cathodic materials are well known in the art and include, by way of example, transition metal oxide materials, sulfides, and selenides, including lithiated compounds thereof. Representative materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$ and $LiCoVO_4$, lithiated manganese oxides, e.g., $LiMn_2O_4$, lithiated nickel oxides, e.g., $LiNiO_2$ and $LiNiVO_4$, and mixtures thereof. Cathode-active material blends of $Li_xMn_2O_4$ (spinel) is described in U.S. Pat. No. 5,429,890 which is incorporated herein. The blends can include $Li_xMn_2O_4$ (spinel) and at least one lithiated metal oxide selected from $Li_xNiO_2$ and $Li_xCoO_2$ wherein $0<x\leq 2$. Blends can also include $Li_y$-$\alpha$-$MnO_2$ ($0\leq y<1$) that has a hollandite-type structure and is described in U.S. Pat. No. 5,561,007, which is incorporated herein.

In one preferred embodiment, the compatible cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a polymeric binder to form under pressure a positive cathodic plate. Suitable binders for use in the cathode have a molecular weight of from about 1,000 to 5,000,000.

Beside PVDF, plasticizers of the present invention are particularly suited for use with polymeric matrices and polymer binders fabricated from a fluorinecontaining polymer or blends thereof. By "fluorine-containing polymers" or "fluoropolymers" is meant fluorinated fluorocarbons, including polytetrafluoroethylene and its fully fluorinated copolymers, and fluoroplastics which are polymers that contain hydrogen or chlorine in addition to fluorine.

Preferred fluoropolymers include, for example, the following homopolymer, copolymers, and terpolymers. Preferred homopolymer include, for example: polychlorotrifluoroethylenes, polyhexafluoropropylenes, polyperfluoroalkoxytrifluoroethylenes, polytetrafluoroethylenes, polyvinylfluorides and mixtures thereof. Homopolymer typically have a molecular weight in the range of 50,000 to 900,000. Preferred copolymers include, for example: poly(perfluoroethylene-co-perfluorovinyl ether)s, poly(tetrafluoroethylene-co-ethylene)s, poly(tetrafluoroethylene-co-propylene)s, poly(vinlylidene difluoride-co-chlorotrifluroethylene)s, poly(vinylidene difluoride-co-ethylene)s, poly(vinylidene difluoride-co-hexafluoroisobutylene)s, poly(vinylindene difluoride-co-hexafluoropropylene)s, poly(vinylidene difluoride-co-propylene)s and mixtures thereof. Copolymers typically have a molecular weight in the range of 10,000 to 900,000. Preferred terpolymers, include for:poly(vinylidene difluoride-co-hexafluoropropylene-cotetrafluoroethylene)s with a molecular weight in the range of 10,000 to 900,000. Fluoropolymers are described in U.S. Patent Ser. No. 08/667,055 by Gao and Mitchell, entitled "Fluoropolymer Blends for Polymeric Electrolyte and Electrodes" of common assignee and filed on Jun. 20, 1996 which is incorporated herein.

In one preferred embodiment, the cathode is prepared from a cathode paste which comprises from about 35 to 65% of a compatible cathodic material; from about 1 to 20% of an electroconductive agent; from about 1 to 20 weight percent of suitable polymeric binders that may include EPDM (ethylene propylene diene termonomer), PVDF (polyvinylidene difluoride), EAA (ethylene acrylic acid copolymer), EVA (ethylene vinyl acetate copolymer), EAA/EVA copolymers, and the like; from about 0 to about 20 weight percent of polyethylene oxide having a number average molecular weight of at least 100,000; from about 10 to 50% of solvent comprising a 10:1 to 1:4 (w/w) mixture of an organic carbonate and a glyme; and from about 5 weight percent to about 25% of a sold matrix forming monomer or partial polymer thereof. Also included is an ion conducting amount of an inorganic ion salt. Generally, the amount of the salt is from about 1 to about 25%.

The electrolyte composition typically comprises from about 5 to about 25 weight percent of the inorganic ion salt based on the total weight of the electrolyte; preferably, from about 10 to 20%; and even more preferably from about 10 to about 15%. The percentage of salt depends on the type of salt and electrolytic solvent employed.

The electrolyte composition typically comprises from 0 to about 80% electrolyte solvent based on the total weight of the electrolyte; preferably from about 60 to about 80%; and even more preferably about 70 weight percent.

The electrolyte composition typically comprises from about 5 to about 30 weight percent of the solid polymeric matrix based on the total weight of the electrolyte; preferably from about 15 to about 25%.

In a preferred embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100,000. Preferably, the film forming agent is employed in an amount of about 1 to about 10 weight percent and more preferably at about 2.5% based on the total weight of the electrolyte composition.

METHODOLOGY

Electrochemical cells are known in the art. See, for example, U.S. Pat. Nos. 5,300,373, 5,316,556, 5,346,385, 5,262,253, 4,472,487, 4,668,595, 5,028,500, and 5,584,893 which are incorporated herein. The inventive method can be adapted to form anode, cathode, and/or polymeric matrix structures in prior art electrochemical cells. The following illustrates a method of how an electrolytic cell could be fabricated with the inventive process. Examples 1 and 2 describe the process of preparing the anode slurry and cathode slurry, respectively. Example 3 describes the procedures for fabricating a solid electrolytic cell.

The anode generally comprises an anode film that is laminated onto one or both sides of the current collector. Similarly, the cathode generally comprises a cathode film that is laminated onto one or both sides of the cathode current collector. The current collector comprises, for example, a screen, grid, expanded metal, woven or non-woven or knitted wire fabric formed from an electron conductive material such as metals or alloys. Each current collector is also connected to a current collector tab which extends from the edge of the current collector. In batteries comprising multiple electrochemical cells, the anode tabs are preferably welded together and connected to a lead. The cathode tabs are similarly welded and connected to a lead. External loads can be electrically connected to the leads. Current collectors and tabs are described in U.S. Pat. Nos. 4,925,752, 5,011,501, and 5,326,653, which are incorporated herein.

EXAMPLE 1

The anode current collector employed is a sheet of expanded copper metal that is about 50 μm thick. It is available under the designation 2Cu5-125 (flatten) from Delker Corp., Branford, Conn. The anode slurry is prepared as follows:

A polymer mixture comprising a copolymer of vinylidenedifluoride (VDF) and hexafluoropropylene (HFP) is prepared by mixing 6.8 grams of the copolymer in 20 grams of acetone. The copolymer (ave. MW 125K) is Kynar Flex 2801™ from Elf Atochem North America, in Philadelphia, Pa. The mixture was stirred for about 24 hours in a milling jar available from VWR Scientific, in San Francisco, Calif., model H-04172-00. The copolymer functions as a binder for the carbon in the anode.

A graphite mixture is prepared separately by first adding 23.4 grams of graphite into 0.9 grams of carbon black into a solution containing 60 grams acetone, and 10.5 grams EEEA (plasticizer). A preferred graphite comprises a purified natural graphite available under the designation BG 35™ from Superior Graphite Co., Chicago, Ill. A preferred carbon black is available under the designation Super P™ from M.M.M. Carbon, Willebroek, Belgium. (Optionally, about 0.5 grams of a surfactant such as Pluronic FC68™ from BASF, Mt. Olive, N.J. and Flurad 430™ from 3M Co. St. Paul, Minn. can be added to the graphite mixture to help disperse the graphite.) The graphite mixture is then vigorously mixed in a high shear mixer until a substantially homogeneous blend is formed. A suitable mixer is available from Ross Model ME100DLX, Hauppauge, N.Y., operating at its highest setting (about 10,000 RPM) for 30 minutes.

The anode slurry is prepared by mixing the polymer mixture and the graphite mixture together under low shear conditions to form the anode slurry wherein the components are well mixed. A portion of the acetone is allowed to evaporate from the slurry before it was casted onto each side of the current collector. Anode films form when the remaining portion of the acetone evaporates.

EXAMPLE 2

The cathode current collector employed is a sheet of expanded aluminum that is about 50 μm thick. The aluminum grid is available under the designation 2AL5-077 from Delker Corp. The cathode slurry is prepared as follows:

A polymer mixture comprising a copolymer of vinylidenedifluoride (VDF) and hexafluoropropylene (HFP) is prepared by mixing 4.4 grams of the copolymer in 15 ml of acetone. The copolymer is Kynar Flex 2801™. The mixture is stirred for about 24 hours in a milling jar.

A cathode mixture is prepared separately by first adding 28.9 grams of a cathode-active material comprising $Li_xMn_2O_4$ (spinel) ($0 \leq x < 2$), 2.4 grams of carbon black (Super P™) into a solution containing 60 grams acetone, and 8.7 grams EEEA. The mixture is then vigorously mixed in a high shear mixer until a substantially homogeneous blend was formed. (Optionally, about 0.5 grams of a surfactant can be added to the cathode mixture.)

The cathode slurry is prepared by mixing the polymer mixture and the cathode mixture together under low shear conditions to form the cathode slurry wherein the components are well mixed. A portion of the acetone is allowed to evaporate from the slurry before it was laminated onto each side of the current collector. Cathode films form when the remaining portion of the acetone evaporates.

The above anode and cathode films can be formed directly on the current collector by casting the slurry mixtures onto the current collector surfaces. Alternatively, each film can be prepared by first casting a slurry onto a substrate or carrier web and allowing the solvent to evaporate thus leaving the film. Thereafter, the films can be casted onto each side of the current collector.

EXAMPLE 3

An electrochemical cell precursor is prepared by positioning a polymeric matrix between the anode and cathode films and thereafter laminating the tri-layer structure under moderate pressure and/or temperature (e.g., 130° C.). The pressure and temperature employed will depend on the polymer(s) forming the matrix. The polymeric matrix is formed by casting a slurry comprising acetone, EEEA, silanized fumed $SiO_2$, and a VDF/HFP copolymer onto a carrier web or other substrate and allowing the acetone to evaporate. The $SiO_2$ is a filler which imparts toughness and strength to the film. In addition, it is believed that the $SiO_2$ assists the activation process by creating physico-chemical conditions such that the electrolyte solution quickly and completely fills the pores created by the removal of the EEEA. Preferably, the slurry is mixed under low shear conditions as not to degrade the copolymer. The anode, cathode, and separator films can be prepared separately or each can be fabricated in the form of a long web and stored as individual rolls. Each web can be cut to size as needed.

Next the EEEA is removed from the electrochemical cell precursor or plurality of such precursors in the case of a battery. Removal is accomplished by positioning the precursor in a chamber that is equipped with a vacuum pump capable of establishing the requisite vacuum conditions. EEEA vapor is pumped out of the precursor until the level of EEEA in the precursor reaches the desired level which is preferably about 50 ppm or less. The precursor can also be heated to facilitate evaporation. In addition to removing the plasticizer, the vacuum will also remove some of the water in the precursor.

Following removal of the EEEA, the precursor is then packaged in moisture-impermeable material which is described, for example, in U.S. Pat. No. 5,326,653 which is incorporated herein. The precursor is then activated preferably in an inert (e.g., argon) atmosphere. Finally, the packaging is sealed.

Typically, removal of the plasticizer takes place following lamination of the anode, cathode, and solid electrolyte precursors. It is understood that the plasticizer can be removed from the individual component precursors prior to being laminated.

While the invention has been described in terms of various preferred embodiments, the skilled artisan will appreciate the various modifications, substitutions, and changes which may be made without departing from the spirit hereof. The descriptions of the subject matter in this disclosure are illustrative of the invention and are not intended to be construed as limitations upon the scope of the invention.

What is claimed is:

1. A method of preparing an electrochemical cell comprising the steps of:

(a) preparing an anode precursor by forming an anode film comprising a carbon material, a first polymeric binder, and a first plasticizer and thereafter removing said first plasticizer;

(b) preparing a cathode precursor by forming a cathode film comprising a cathodic material, a second polymeric binder, and a second plasticizer and thereafter removing said second plasticizer;

(c) preparing a polymeric electrolyte precursor by forming a polymeric matrix comprising a third plasticizer and thereafter removing said third plasticizer; and (d) activating said anode precursor, said cathode precursor, and said polymeric electrolyte precursor, wherein said polymeric electrolyte precursor is positioned between said anode precursor and said cathode precursor, and wherein at least in one of steps (a), (b), or (c), said plasticizer is removed by evaporation under vacuum.

2. The method of claim 1 further comprising the step of laminating said polymeric electrolyte precursor to said anode precursor and to said cathode precursor prior to step (d).

3. The method of claim 1 wherein said first, second, and third plasticizers comprise 2-(2-ethoxyethoxy) ethyl acetate, dimethyl adipate, dibutyl phthalate, propylene carbonate, and mixtures thereof.

4. The method of claim 1 wherein plasticizer is removed from at least one of either the anode, cathode, or polymeric electrolyte precursor by placing the precursor in a chamber and establishing a vacuum in chamber of less than about 1 torr and pumping plasticizer from the chamber.

5. The method of claim 4 wherein the chamber is heated to temperature of about 30° C. to about 135° C.

6. The method of claim 1 wherein said polymeric matrix and said first and second polymeric binders comprise a fluorine-containing polymer.

7. The method of claim 1 wherein said polymeric matrix and said first and second polymeric binders comprise a copolymer of vinylidenedifluoride and hexafluoropropylene.

8. A method of preparing an electrochemical cell comprising the steps of:

(a) forming an anode film comprising anode active material, a polymeric binder and a first plasticizer;

(b) forming a cathode film comprising a cathode active material, a polymeric binder and a second plasticizer;

(c) forming a polymeric layer comprising a third plasticizer;

(d) positioning said polymeric layer between said anode film and said cathode film to form a tri-layer structure;

(e) removing said plasticizers from the tri-layer structure by evaporation under vacuum to form an electrochemical cell precursor; and (f) activation said electrochemical cell precursor to form an electrochemical cell.

9. The method of claim 8 further comprising the step of laminating said polymeric layer to said anode film and to said cathode film prior to step (e).

10. The method of claim 8 wherein said first, second, and third plasticizers comprise 2-(2-ethoxyethoxy) ethyl acetate, dimethyl adipate, dibutyl phthalate, propylene carbonate, and mixtures thereof.

11. The method of claim 8 wherein step (e) comprises placing the trilayer structure in a chamber and establishing a vacuum in chamber of less than about 1 torr and pumping plasticizer from the chamber.

12. The method of claim 11 wherein the chamber is heated to temperature of about 30° C. to about 135° C.

13. The method of claim 8 wherein said polymeric matrix and said first and second polymeric binders comprise a fluorine-containing polymer.

14. The method of claim 8 wherein said polymeric matrix and said first and second polymeric binders comprise a copolymer of vinylidenedifluoride and hexafluoropropylene.

15. A method of preparing an electrochemical cell comprising the sequential steps of:

(a) forming an anode film comprising anode active material, a polymeric binder and a first plasticizer;

(b) forming a cathode film comprising a cathode active material, a polymeric binder and a second plasticizer;

(c) forming a polymeric layer comprising a third plasticizer;

(d) positioning said polymeric layer between said anode film and said cathode film to form a tri-layer structure;

(e) removing said plasticizers from the tri-layer structure by evaporation under vacuum to form an electrochemical cell precursor; and (f) activation said electrochemical cell precursor to form an electrochemical cell.

16. The method of claim 15 further comprising the step of laminating said polymeric layer to said anode film and to said cathode film prior to step (e).

17. The method of claim 15 wherein said first, second, and third plasticizers comprise 2-(2-ethoxyethoxy) ethyl acetate, dimethyl adipate, dibutyl phthalate, propylene carbonate, and mixtures thereof.

18. The method of claim 15 wherein step (e) comprises placing the tri-layer structure in a chamber and establishing a vacuum in chamber of less than about 1 torr and pumping plasticizer from the chamber.

19. The method of claim 18 wherein the chamber is heated to temperature of about 30° C. to about 135° C.

20. The method of claim 15 wherein said polymeric matrix and said first and second polymeric binders comprise a fluorine-containing polymer.

21. The method of claim 15 wherein said polymeric matrix and said first and second polymeric binders comprise a copolymer of vinylidenedifluoride and hexafluoropropylene.

22. A method of preparing an electrochemical cell comprising the steps of:

(a) preparing an anode precursor by forming an anode film comprising a carbon material, a first polymeric binder, and a first plasticizer and thereafter removing said first plasticizer;

(b) preparing a cathode precursor by forming a cathode film comprising a cathodic material, a second polymeric binder, and a second plasticizer and thereafter removing said second plasticizer;

(c) preparing a polymeric electrolyte precursor by forming a polymeric matrix comprising a third plasticizer and thereafter removing said third plasticizer;

(d) laminating said polymeric electrolyte precursor to said anode precursor and to said cathode precursor wherein said polymeric electrolyte precursor is positioned between said anode precursor and said cathode precursor; and, thereafter, (e) activating said anode precursor, said cathode precursor, and said polymeric electrolyte precursor, wherein at least in one of steps (a), (b), or (c), said plasticizer is removed by evaporation under vacuum.

23. The method of claim 22 wherein said first, second, and third plasticizers comprise 2-(2-ethoxyethoxy) ethyl acetate, dimethyl adipate, dibutyl phthalate, propylene carbonate, and mixtures thereof.

24. The method of claim 22 wherein plasticizer is removed from at least one of either the anode, cathode, or polymeric electrolyte precursor by placing the precursor in a chamber and establishing a vacuum in chamber of less than about 1 torr and pumping plasticizer from the chamber.

25. The method of claim 24 wherein the chamber is heated to temperature of about 30° C. to about 135° C.

26. The method of claim 22 wherein said polymeric matrix and said first and second polymeric binders comprise a fluorine-containing polymer.

27. The method of claim 22 wherein said polymeric matrix and said first and second polymeric binders comprise a copolymer of vinylidenedifluoride and hexafluoropropylene.

28. A method of preparing an electrochemical cell comprising the steps of:
(a) forming an anode film comprising anode active material, a polymeric binder and a first plasticizer;
(b) forming a cathode film comprising a cathode active material, a polymeric binder and a second plasticizer;
(c) forming a polymeric layer comprising a third plasticizer;
(d) positioning said polymeric layer between said anode film and said cathode film to form a tri-layer structure;
(e) laminating said polymeric layer to said anode film and to said cathode film; and thereafter,
(f) removing said plasticizers from the tri-layer structure by evaporation under vacuum to form an electrochemical cell precursor; and
(g) activation said electrochemical cell precursor to form an electrochemical cell.

29. The method of claim 28 wherein said first, second, and third plasticizers comprise 2-(2-ethoxyethoxy) ethyl acetate, dimethyl adipate, dibutyl phthalate, propylene carbonate, and mixtures thereof.

30. The method of claim 28 wherein step (f) comprises placing the tri-layer structure in a chamber and establishing a vacuum in chamber of less than about 1 torr and pumping plasticizer from the chamber.

31. The method of claim 30 wherein the chamber is heated to temperature of about 30° C. to about 135° C.

32. The method of claim 28 wherein said polymeric matrix and said first and second polymeric binders comprise a fluorine-containing polymer.

33. The method of claim 28 wherein said polymeric matrix and said first and second polymeric binders comprise a copolymer of vinylidenedifluoride and hexafluoropropylene.

* * * * *